No. 888,625. PATENTED MAY 26, 1908.
J. D. LINDSLEY.
HORSE DETACHER.
APPLICATION FILED NOV. 25, 1907.

2 SHEETS—SHEET 1.

Witnesses.
C. L. Bronson
Francis A. Leach

Inventor.
John D. Lindsley
By Rich K. Manning
Attorney

No. 888,625.  
PATENTED MAY 26, 1908.  
J. D. LINDSLEY.  
HORSE DETACHER.  
APPLICATION FILED NOV. 25, 1907.  
2 SHEETS—SHEET 2.
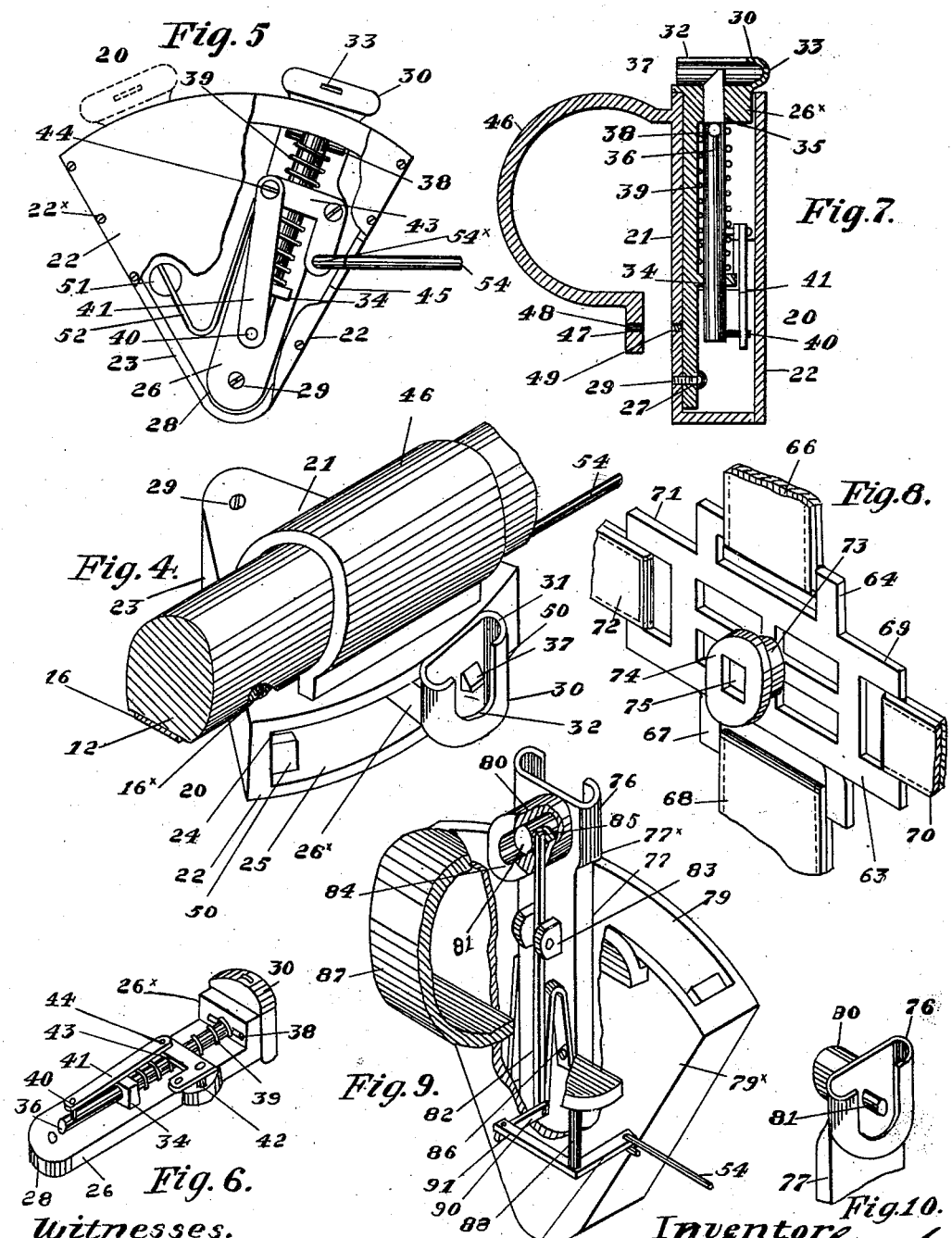
Witnesses.  
Inventor,  
John D. Lindsley  
By his Attorney

UNITED STATES PATENT OFFICE.

JOHN D. LINDSLEY, OF KANSAS CITY, MISSOURI, ASSIGNOR OF ONE-FOURTH TO CHARLES H. CONS, OF KANSAS CITY, MISSOURI.

HORSE-DETACHER.

No. 888,625.     Specification of Letters Patent.     Patented May 26, 1908.

Application filed November 25, 1907. Serial No. 403,724.

*To all whom it may concern:*

Be it known that I, JOHN D. LINDSLEY, a citizen of the United States of America, residing at Kansas City, in the county of Jackson and State of Missouri, have invented certain new and useful Improvements in Horse-Detachers; and I do hereby declare that the following is a full, clear, and exact description of the invention, such as will enable others to make and use the same, reference being had to the accompanying drawings, forming a part of this specification:

The object of the invention is: First, to enable a horse to be attached to a vehicle with despatch and thus economize the time usually required, and secondly, to detach the horse with the same expedition and afford a means of safety when the horse is unmanageable and the vehicle in motion.

The invention consists in the novel construction and combination of parts, such as will be first fully described and then specifically pointed out in the claims.

Figure 1:
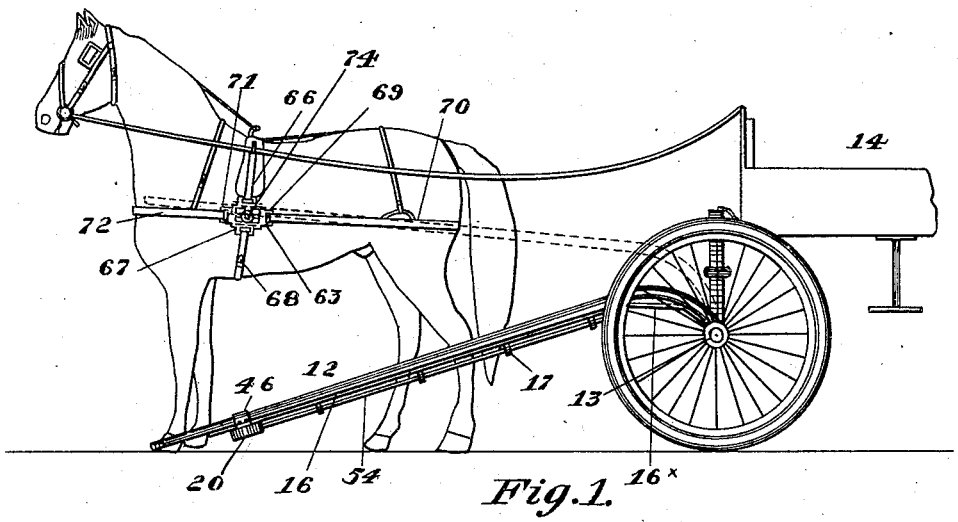
Figure 2:
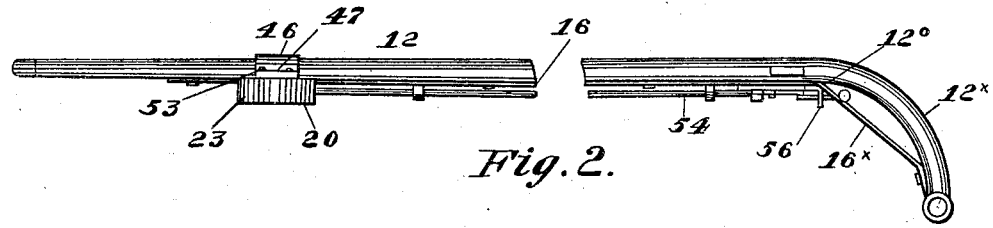
Figure 3:
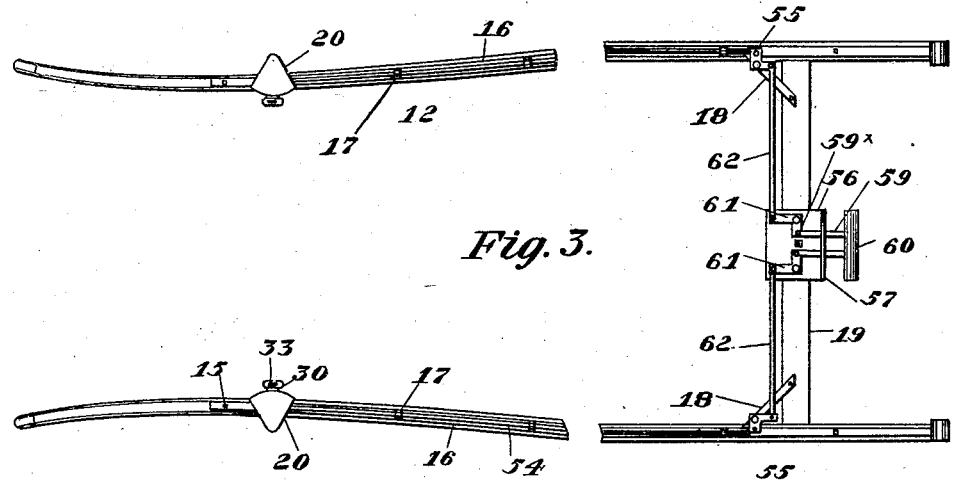
Figure 11:
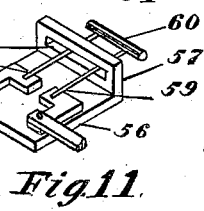

In the drawings: Figure 1 is a side view of a horse and vehicle, showing the invention, the shafts being in a lowered position and the horse within the shafts. Fig. 2 is an enlarged side view in detail of the shafts, showing the invention applied thereto and the trussed ear ends of the shafts. Fig. 3 is a plan view of the shafts in an inverted position, showing the invention upon the shafts. Fig. 4 is an enlarged detail view in perspective, showing a portion of one of the shafts, the casing and band on the shaft, the pivoted coupling bar carrying the releasable catch and a portion of the operating wire or rod. Fig. 5 is a view of the casing from the bottom with a portion of the bottom plate broken away to show the pivoted coupling bar, the sliding catch and levers and a portion of the operating wire or rod on the shafts. Fig. 6 is a detail view in perspective of the pivoted coupling bar and the sliding catch as seen in Fig. 5. Fig. 7 is a transverse sectional view of the casing and shaft clamping band as seen in Fig. 4. Fig. 8 is an enlarged detail view in perspective of the harness buckle, showing portions of the breast strap, saddle strap, girth strap and breech strap, respectively, and the device on the buckle engaging with the pivoted coupling bar on the shafts. Fig. 9 is an enlarged broken view in perspective of the casing for the shafts, showing modifications of the device for operating the catch bolt and Fig. 10 is a modification of the catch bolt as seen in Fig. 9. Fig. 11 is a detail view of the plate on the shafts for the bell crank levers.

Similar numerals of reference indicate corresponding parts in all the figures of the drawings.

The invention dispenses with the ordinary whiffletree upon the shafts, and consequently the traces upon the breast strap or hames of the harness for the draft animal, and performs the functions of both with added capabilities.

Referring to the drawing, 12 indicates the shafts, to which the invention is principally applied, and as shown in the drawing, the rear ends of these shafts, as commonly constructed, are bent at $12^\times$ in the arc of a circle and connected in the usual manner with the front axle, 13, of the vehicle, 14. Upon the under or lower surfaces of the shafts is secured by screws, 15, narrow metal straps, 16, extending from a point about one-third the distance inwardly from the outer ends of said shafts toward their rear ends to a point $12°$ on said shafts at which the bend begins, at which point the metal plates, 16, are bent at an angle and extended to and connected with the lower curved portions, $12^\times$, of the shafts. Upon these plates are secured eyes or loops, 17, which loops are spaced at short equal distances apart, as farther described. Brace bars, 18, which are short in length, extend from the strap 16 at a point a short distance forward of the cross or transverse connecting bar, 19, to the shafts, and are connected with said bar.

The shaft supporting and detaching devices consist of a case, 20, the upper plate 21 and lower plate, 22, being in the form as shown of a sector, and arranged a short distance apart, the sides, 23, of the case extending in radial lines from a common center to the outer portion, 24, of the case, which, as shown is curved in the arc of a circle and provided with an opening, 25, extending from one side, 22, to the other side of the case. The sides, 23, and upper plate, 21, are formed integral with each other, the lower plate, 22, being detachable and secured to the sides by the screws, $22^\times$. Within the case 20, is a movable flat bar, 26, having a perforation, 27, at its inner end, which end of the bar is curved at 28, and extends quite closely to the inner end of the case formed by the radial sides thereof, said bar being pivotally connected to the upper plate, 21, by the pivot or screw bolt, 29, extending through the perforation, 27, in said bar 26 into the upper plate, 21. The outer end of the bar 26 extends through the opening, 25, in the case 20, and a short distance beyond the outer curved surface, 24, of the case 20, and adjacent to said opening, said bar is increased in thickness, as at 26×, and extends to within a slight distance of the inner surface of the plate 22. Upon the said outer end of the pivoted bar 26, is a hollow elliptically shaped casting or socket plate, 30, arranged as shown in a vertical position with the opening 31 extending in an upward direction to form a coupling head, as further described. In the outer side of the casting or socket, 30, is a narrow opening, 32, extending from the upper end of the socket downwardly about two-thirds the distance in the direction of the bottom of said socket, the lower end of said opening, 32, being curved in the arc of a circle. In the bottom of said socket, 30, is an opening, 33, for the escape of moisture. Upon the inner side of the pivoted bar, 26, at a point about one-third the distance from the pivot 29, toward the outer end of the said bar is a perforate lug, 34, and extending through the enlarged portion, 26×, of said bar in direct line with said lug 34, is a sliding bolt or bar, 36, the inner end of which bar extends a short distance inwardly from said lug, 34. The outer end of the bar 36 is made square sided to fit within the opening 35, in the portion 26× of said pivoted bar, the extreme end of said bar extending within the socket 30, and is inclined or beveled downwardly and inwardly to form a catch, 37.

Through the bar 36, at a point a slight distance in rear of the square portion, at its outer end, extends a pin, 38. Extending around the bar 36 is an expanding spiral spring, 39, one end of which spring bears against the pin 38, and the other end against the lug 34. With the inner end of the bar 36 is connected a short pin, 40, extending above the height of lug 34, and with said pin is pivotally connected one end of an arm, 41, the other end of which arm extends in the direction of the opening 25 in said case 20, a considerable distance past the lug 34. Upon one side of the bar 36 is secured a pivot post, 42 (see Fig. 6), upon which is pivoted a bell crank lever, 43, one arm of which lever is pivotally connected at 44 with the upper end of the arm 41, connected with the catch bolt 36. Through the side 22 of the case 20, adjacent to the pivot post, 42, is a transverse opening, 45.

Upon the upper surface of the plate 21 of case 20, at a point a short distance inwardly from the curved surface 24, of said case and upon the line of a chord to said surface is connected rigidly one end of a spring plate or clip, 46, the other end of which plate extends upwardly and is bent in the arc of a circle, and extended downwardly in the direction of plate 21 and to within a short distance of said plate and upon the said end of the spring plate is an outwardly extended flange, 47, in which flange is an opening, 48. In the plate 21, directly beneath the opening 48, is a screw threaded opening, 49.

Within the opening 25 of the case 20, and connected with the sides 22, are spring buffers, 50, preferably made of rubber, against which the pivoted bar, 26, comes into contact in its forward and rearward movements. In order to retain the said bar, 26, normally adjacent to the side 23 of the case 20, having the opening 45, a slotted lug, 51, is secured to the inner side of plate 21, in the direction of the other side, 22, of the said case, and at a point equi-distant the ends of said side, in the slot of which lug is inserted one end of a flat U-shaped spring, 52, the other portion or end of the spring extends to and bears upon the adjacent side of the pivoted bar, 26.

The application of the case 20 is made as shown to the under side of the respective shafts 12, with the openings 25 of the cases upon the opposite shafts toward each other, and the said cases in a horizontal position with the openings 45, in the cases directed toward the rear ends of shafts 12. In this application, the forward ends of the shafts are extended within the spring plates, 46, and the cases moved rearwardly to a point near the forward ends of the plates or straps, 16, on the under side of shafts 12, as seen in Figs. 2 and 3, or at the usual point at which the harness upon the animal supports the shafts. In this position of the cases 20, the cases are secured by rivets, 16×, to the bars 16 (see Fig. 4), and the screws, 53 (see Fig. 2), are extended through the openings, 48, in the flanges 47, on the spring plates 46 (see Fig 7), into the openings 49, in the plate 21, and the spring plate caused to firmly grasp the shafts 12, and prevent any movement of said cases.

Within the eyes or loops, 17, on the straps 16, on the shafts 12, are stout wires, 54. One end of the wires is extended within the openings 45 in the cases 20, and are connected at 54× with the arms of the respective bell crank levers, 43, adjacent to said openings. The other ends of the wires, 54, extend to a position near the braces 18 on the under sides of shafts 12, and are connected with one arm of the respective bell crank levers, 55, pivoted to said braces. Upon the under side of the connecting bar 19, at a point equi-distant from its ends, is secured a wide plate, 56, upon which is a rear downwardly extended flange, 57, in which flanges is a slot, 58, in which slot are two movable bars, 59, secured rigidly to a transverse hand bar, 60. Upon the said plate, 56, are pivoted in opposite positions to each other, the pair of bell crank levers, 61, the respective arms of said levers adjacent to the inner ends of the bars 59 being connected pivotally to said bars at 59×. With the other arms of the respective bell crank levers are connected pivotally the adjacent ends of connecting bars, 62, the other ends of which bars are connected with the adjacent arms of the bell crank levers, 55, on the braces 18, on shafts 12.

The coupling or keeper for the support of the shafts on the harness consists of single buckles, 63, upon the opposite sides of the animal, and in this particular, four slotted extensions of the buckle are shown in Fig. 8, the upper slotted extensions being designated 64, and with said extensions is connected the ordinary saddle straps, 66, upon the saddle of the harness. With the lower slotted extensions 67, which are inwardly bent to afford clearance for band 68, of the buckle is connected the ends of the girth band 68. With the rear slotted extensions, 69, of the buckle is connected the free ends of the breeching strap, 70, and with the forward slotted extensions, 71, of the buckles are connected the ends of the breast strap, 72. Upon this buckle is a circular outwardly extended stud, 73, of the proper size to fit within the opening, 32, of the socket, 30, on the pivoted bar, 26, and upon the outer end of said stud is a circular keeper plate, 74, of the proper size to readily enter the opening 31, in the socket plate 30. In the outer surface of the circular keeper plate, 74, is a depression, 75, as shown, rectangular in form.

In the operation of attaching the shafts to the harness, the draft animal is placed within the shafts as seen in Fig. 1, in the usual manner, the shafts are raised by the hands and the opening 31 in the socket coupling plates 30, upon one shaft placed beneath the circular keeper plate, 94, on the buckle 63 on the harness and moved upwardly, admitting said plate within the socket 30, and forcing rearwardly the head, 47, of the catch bolt, 26, and as soon as the opening 75 comes opposite said catch bolt, the catch bolt enters said opening, securing said shaft to the harness. The same operation is repeated with the other shaft upon the other side of the animal, and the horse is at once in readiness to be driven. Should the animal become unmanageable, and the occupant of the vehicle desire to free the animal and thus escape danger of collisions or continued speed, the occupant reaches over the dash board of the vehicle, grasps the cross-bar 60 with the hand, imparts a strong rearward movement to said bar, which draws upon the wires 54, and the bell crank levers, 43, in the cases 20, and the arms 41, drawing in the catch bars 36, compressing spring 39, and releasing the keeper plates, 74, and the shafts become instantly detached and the forward ends fall upon the ground, leaving the animal to pursue the direction taken, unrestricted by the vehicle. In cases of "runaways", the horse may be detached from the side of the vehicle thus obviating the danger attendant upon attempting to grasp the head of the animal.

In either hitching or unhitching with my invention, a great saving in time is attained, so that many vehicles may be prepared for employment with fewer attendants than ordinarily required. Instead of applying the cases 20 to the under side of the shafts, they may be arranged on the inner sides of the shafts in a vertical position if desired, as seen in Fig. 9. In this position, the socket, 76, upon the outer end of the pivoted bar, 77, in the cases is extended in the same longitudinal direction of the bar, and projected a slight distance forward as at 77×, beyond the line of the outer surface of the side 79, of the case. Upon the inner side of the socket is a horizontally extended socket, 80, communicating with the socket 76, in which is a round catch bolt, 81. A vertically disposed lever, 82, is pivoted between lugs 83 on the pivoted bar, 77, the upper end of which lever, 82, extends within a longitudinal slot, 84, in the under side of the socket 80, and within an opening 85 in the rear end of the bolt 81. Between the lower end of the lever 82 and the adjacent side of the pivoted bar 77, is a flat U-shaped spring, 86, bent upon itself and connected with the said bar 77, the opposite end of the spring bearing upon the inner surface of the lower end of said lever.

Upon the side 79× of the case, which is adjacent to the shaft, is the clip 87, which is the same as the spring clip 46 in Fig. 1, both ends, however, being connected rigidly with plate 79×, and secured to the plate 16 on 12 in like manner. With the lower rear end portion of the said clamping plate 87, is connected the upper end of a pivot post, 88, upon the lower end of which post, which extends downwardly a distance corresponding to the lower end of lever 82, within the case. Upon this pivot post 88 is a bell crank lever, 89, and with one arm of which lever is connected the wire 54, on the shafts 12. With the other arm of the said lever is pivotally connected at 91 the outer end of a short connecting bar, 90, the inner end of which bar extends through an opening in the side 79× of the case, and is pivotally connected with the lower end of the lever 82.

The outer portions of the catch bolt as seen in Fig. 10 are slightly rounded so as to offer little resistance in the entrance of the keeper in the socket 76, in which keeper the opening may be made round instead of square. In the movement forward of the animal to draw the vehicle, the draft is immediate upon the coupling heads at the outer ends of the pivoted bars, and these bars move forward, compressing the springs 52 and coming into contact with the spring buffers, 50 in which instance the releasing wires 54 slide within the loops on shafts, 12. As soon as the draft upon the vehicle is lessened, these couplings move rearwardly, and during the alternate movements of the animal in stepping, the couplings 30 move alternately with the like effect of the ordinary whiffletree, to give the horse motion.

The application of the invention may be made to double shafts for two horses, if preferred, and such other modifications employed as are within the scope of the invention.

Having fully described my invention, what I now claim as new and desire to secure by Letters Patent is:

1. In a horse detacher, the combination with the shafts of a vehicle, spring controlled pivoted draft bars mounted thereon, coupling heads on said bars having vertically disposed socket plates with openings therein extending in an upward direction, keeper plates extending within said sockets, and sliding catch bolts extending within said sockets, of spring controlled releasing levers carried by said pivoted draft bars, and adapted to actuate said catch bolts.

2. In a horse detacher, the combination with the shafts of a vehicle, spring controlled, pivoted draft bars mounted thereon, coupling heads on said bars having vertically disposed socket plates with openings therein extending in an upward direction, keeper plates extending within said sockets, and spring controlled sliding catch bolts extending in the longitudinal direction of said pivoted bars and within said sockets, of bell crank levers carried by said pivoted bars for releasing said catch bolts, and arms pivotally connected with the catch bolts and also with said bell crank levers.

3. In a horse detacher, the combination with the shafts of a vehicle of spring controlled pivoted bars mounted thereon, coupling heads upon said bars, locking devices within the coupling heads, coupling devices adapted to engage with said locking devices, and buffers adapted to limit the to and fro movements of said pivoted bars.

4. In horse detachers, the combination with the shafts of a vehicle of cases secured to said shafts and having openings in one end thereof, pivoted bars within said cases having coupling heads and sockets in said heads, perforate lugs on said pivoted bars, sliding catch bolts positioned by said lugs and extending within said sockets, springs upon said bars, arms connected with said catch bolts, pivot posts on said pivoted bars, bell crank levers on said posts actuating said arms, wires on said shafts connected with said bell crank levers and cushioning devices in said cases in the path of said pivoted bars.

JOHN D. LINDSLEY.

Witnesses:
S. L. C. HASSON,
G. ROY ARTERBURN.